US010189078B2

(12) United States Patent
    Kadowaki

(10) Patent No.: US 10,189,078 B2
(45) Date of Patent: Jan. 29, 2019

(54) MOLD OSCILLATOR

(71) Applicant: JP STEEL PLANTECH CO., Yokohama-shi (JP)

(72) Inventor: Yuki Kadowaki, Yokohama (JP)

(73) Assignee: JP STEEL PLANTECH CO., Yokohama-shi (JP)

( * ) Notice: Subject to any disclaimer, the term of this patent is extended or adjusted under 35 U.S.C. 154(b) by 0 days.

(21) Appl. No.: 15/552,144

(22) PCT Filed: Feb. 9, 2016

(86) PCT No.: PCT/JP2016/053812
  § 371 (c)(1),
  (2) Date: Aug. 18, 2017

(87) PCT Pub. No.: WO2016/132968
  PCT Pub. Date: Aug. 25, 2016

(65) Prior Publication Data
  US 2018/0043425 A1    Feb. 15, 2018

(30) Foreign Application Priority Data
  Feb. 19, 2015  (JP) .................. 2015-030292

(51) Int. Cl.
  *B22D 11/053*       (2006.01)
  *F16H 25/22*        (2006.01)
  (Continued)

(52) U.S. Cl.
  CPC ....... *B22D 11/053* (2013.01); *F16H 25/2204* (2013.01); *F16H 57/029* (2013.01);
  (Continued)

(58) Field of Classification Search
  CPC . B22D 11/053; F16H 25/2204; F16H 57/029; F16H 57/0497; H02K 7/06; H02K 7/1004
  See application file for complete search history.

(56) References Cited

U.S. PATENT DOCUMENTS 4,727,924 A * 3/1988 Dobinski ............. B22D 11/053
                                                164/416
4,945,975 A * 8/1990 Sorimachi ........... B22D 11/053
                                                164/416

(Continued)

FOREIGN PATENT DOCUMENTS

| JP | 63-256242 A  | 10/1988 |
| JP | 11-506982 A  | 6/1999  |
| JP | 2003-220638 A | 8/2003 |

OTHER PUBLICATIONS

International Search Report Issued Apr. 12, 2016, in PCT/JP2016/053612 filed Feb. 9, 2016.

(Continued)

*Primary Examiner* — Kevin E Yoon
(74) *Attorney, Agent, or Firm* — Oblon, McClelland, Maier & Neustadt, L.L.P.

(57) ABSTRACT

A mold oscillator includes a ball screw unit that has a ball screw 32 having a threaded shaft 29 and a ball nut 30, and has a nut-side shaft 31 fixed to the ball nut 30 coaxially with the threaded shaft 29, wherein the ball screw unit is positioned so that the central axis of the ball screw unit extends in the vertical direction. A casing surrounds at least part of the ball screw 32. The ball nut 30 of the ball screw 32 and part of the threaded shaft 29 of the ball screw 32, on which, part the ball nut 30 is engaged with the threaded shaft 29, are submerged in a lubricating oil so as to be able to lubricate the ball screw 32 with an oil bath.

5 Claims, 11 Drawing Sheets

(51) Int. Cl.
*F16H 57/029* (2012.01)
*F16H 57/04* (2010.01)
*H02K 7/06* (2006.01)
*H02K 7/10* (2006.01)
*F16H 25/20* (2006.01)

(52) U.S. Cl.
CPC ........... *F16H 57/0497* (2013.01); *H02K 7/06* (2013.01); *H02K 7/1004* (2013.01); *F16H 2025/2031* (2013.01); *F16H 2025/2043* (2013.01); *F16H 2025/2096* (2013.01)

(56) References Cited

U.S. PATENT DOCUMENTS 5,458,182 A * 10/1995 Aoki .................... B22D 11/166
128/925
5,809,838 A * 9/1998 Miyaguchi .......... F16H 25/2214
74/89.44

OTHER PUBLICATIONS

Written Opinion of the international Searching Authority dated Apr. 12, 2016. In PCT/JP2016/053812 flied Feb. 9. 2016.

* cited by examiner

MOLD OSCILLATOR

TECHNICAL FIELD

The present invention relates to a mold oscillator for oscillating a mold to reduce friction between the mold and a surface of a cast piece in a continuous casting machine for continuously casting steel or the like.

BACKGROUND ART

In a continuous casting machine for continuously casting steel, molten steel is poured from a tundish into a rectangular tube-shaped mold and the molten steel is cooled through contact with the mold, a cast piece, in which unsolidified steel is present at the center portion thereof, is continuously drawn downward, and molten steel is continuously poured into the mold. The cast piece drawn downward out of the mold is water cooled by water spray. Finally, after completely solidified, the cast piece is cut into pieces of predetermined length and sent to a downstream process, that is, rolling.

In the mold, molten steel is brought into contact with the inner side surface of the mold, so that the molten steel is cooled and a solidified shell is formed. In order to prevent the solidified shell from adhering to the inner side surface of the mold, the mold is oscillated in the vertical direction (Patent Document 1). This prevents the cast piece from adhering to the inner side surface of the mold, so that it is possible to smoothly draw the cast piece out of the bottom of the mold.

FIG. 8 is a schematic diagram showing an eccentric cam-type mold oscillator. As shown in FIG. 8, an arm support portion 3 is mounted on a partition wall 6. One end portion of a sub-arm 4 and a midpoint portion of a main arm 5 are respectively supported in a swingable manner by horizontal pivot shafts 3a and 3b provided in the arm support portion 3. A mold 1 is supported on an oscillation table 2 and oscillated together with the oscillation table 2. The other end portion of the sub-arm 4 and one end portion of the main arm 5 are respectively connected to horizontal pivot shafts 2a and 2b of the oscillation table 2 in a swingable manner. In this way, the main arm 5 and the sub-arm 4 constitute a parallel link, so that the four points, the pivot shafts 3a, 3b, 2b and 2a, operate in relation to one another with distances therebetween being fixed. The distance between the pivot shafts 2a and 2b, the distance between the pivot shafts 3a and 3b, the distance between the pivot shafts 3a and 2a, and the distance between the pivot shafts 3b and 2b are set so that extensions of line segments 2c and 2d cross each other at a swing arm center 1a, the line segment 2c connecting between the pivot shaft 3a and the pivot shaft 2a, the line segment 2d connecting between the pivot shaft 3b and the pivot shaft 2b. Accordingly, when the parallel link (the main arm 5 and the sub-arm 4) swings, the mold 1 is oscillated (swings) in the vertical direction about the swing arm center 1a along an arc with a certain curvature radius.

A motor 10 is mounted on an installation floor with the pivot shaft being horizontally positioned. The rotary shaft of the motor 10 is provided with an eccentric cam 9. The eccentric cam 9 and a pivot shaft 7 at the other end of the main arm 5 are connected via a link 8. Accordingly, rotation of the motor 10 causes rotation of the eccentric cam 9, which in turn causes vertical movement of the link 8 via the eccentric cam 9. The vertical movement of the link 8 causes the main arm 5 to swing, which in turn causes the sub-arm 4 to swing. In this way, the mold 1 is oscillated in the vertical direction.

FIG. 9 is a schematic diagram showing a hydraulic servo-type mold oscillator. In this hydraulic servo-type mold oscillator, a hydraulic servo cylinder 11 is installed in place of the eccentric cam. In the hydraulic servo cylinder 11, an upper end of a piston 12 is rotatably connected to a pivot shaft 7, so that the other end portion (pivot shaft 7) of a main arm 5 is caused to reciprocate in the vertical direction by the piston 12 driven by the hydraulic servo cylinder 11.

FIG. 10 is a schematic diagram showing an electrically driven servo-type mold oscillator. In this electrically driven servo-type mold oscillator, an electrically driven servo actuator 20 is installed in place of the eccentric cam shown in FIG. 8. FIG. 11 is a schematic diagram showing the electrically driven servo actuator 20. A base 21 is mounted on an installation floor. A servo motor 22 and a cylinder tubes 33 are installed on the base 21. The servo motor 22 is installed so that a rotary shaft 23 is positioned in the base 21 with the axial direction of the rotary shaft 23 being directed downward in the vertical direction. The rotary shaft 23 is provided with a pulley 24. A threaded shaft 29 of a ball screw is rotatably installed via angular bearings 55 with the axial direction of the threaded shaft 29 being directed in the vertical direction, and a lower part of the threaded shaft 29 is positioned in the base 21. A pulley 25 is fixed to a lower end portion of the threaded shaft 29. A belt 26 is looped between the pulley 24 and the pulley 25. Accordingly, forward and reverse rotation of the motor 22 causes forward and reverse rotation of the threaded shaft 29 via the belt 26. Accordingly, in this embodiment, the pulleys 24 and 25, and the belt 26 function as the power transmitting mechanism.

In the cylinder tube 33, a nut-side shaft 31 is fixed to a ball nut 30 coaxially with the threaded shaft 29 that is positioned with the central axis thereof being directed in the vertical direction. The ball nut 30 is screw-fitted on the threaded shaft 29 with balls interposed therebetween. Forward and reverse rotation of the threaded shaft 29 causes the ball nut 30 to move in the vertical direction. The nut-side shaft 31 is fixed to the upper end of the ball nut 30 with the axial direction of the nut-side shaft 31 being directed in the vertical direction. The nut-side shaft 31 is supported by ball splines 34 so as to be able to move in the vertical direction. The upper end of the nut-side shaft 31 protrudes upward from an upper portion of the cylinder tube 33. The upper end of the nut-side shaft 31 is connected to the pivot shaft 7 at the other end of the main arm 5.

In the electrically driven servo-type mold oscillator, the belt 26 transmits rotational driving force produced by forward and reverse rotation of the rotary shaft 23 of the servo motor 22 to the threaded shaft 29 in the cylinder tube 33, which causes forward and reverse rotation of the threaded shaft 29. The forward and reverse rotation of the threaded shaft 29 causes the ball nut 30 screw-fitted on the threaded shaft 29 to move in the vertical direction, which in turn causes the nut-side shaft 31 fixed to the upper end of the ball nut 30 to move in the vertical direction. In this way, a main arm 5, to which an upper end portion of the nut-side shaft 31 is connected via a pivot shaft 7, swings about a pivot shaft 3b. The swinging motion of the main arm 5 is followed by swinging motion of a sub-arm 4, which in turn causes a mold 1 to oscillate in the vertical direction.

PRIOR ART DOCUMENT

Patent Document

[Patent Document 1] Japanese Translation of PCT international Application Publication No. H11-506382 (JP 11-506982 A)

SUMMARY OF INVENTION

Problems to be Solved by the Invention

However, in the eccentric cam-type mold oscillator, amplitude of oscillation cannot be changed during casting operation. Moreover, a pattern with time, or waveform, of oscillation of the mold is limited to a sinusoidal wave. In contrast, in the hydraulic servo-type mold oscillator, amplitude of oscillation of the mold can be changed even during casting operation by adjusting timing of control of the pressure for advancing the piston 12 of the hydraulic servo cylinder 11 and the pressure for retracting the piston 12. Moreover, the pattern of the mold oscillation is not limited to a sinusoidal wave and it is possible to set a non-sinusoidal waveform. Also in the electrically driven servo-type mold oscillator, amplitude of oscillation of the mold can be changed even during casting operation. Moreover, the pattern of the mold oscillation can be set to either of a sinusoidal waveform and a non-sinusoidal waveform.

However, the hydraulic servo-type mold oscillator requires inspection of filters, hydraulic oil, etc. of the hydraulic servo cylinder 11. Moreover, it is required, to control contamination of the hydraulic oil.

In the case of the electrically driven servo-type mold oscillator, the nut-side shaft 31 is caused to move in the vertical direction by forward and reverse rotation of the servo motor. In this case, the amplitude required for the purpose of mold oscillation is small, that is, about ±6 mm for example. This means that the amplitude of the vertical movement of the pivot shaft 7 of the main arm 5 is correspondingly small. For this reason, the rotation angle of the threaded shaft 29 tor swinging operation is small and moreover, long-time continuous operation is required, which means that the threaded shaft 29 and the ball nut 30 are required to operate under severe conditions. Conventionally, ordinary grease is used to lubricate the threaded shaft 29 and the ball nut 30. However, the threaded shaft 20 is repeatedly rotated forward and backward within a small oscillatory rotation angle and therefore, there is a possibility that breakdown of oil film occurs in the case of grease lubrication.

The present invention has been made in consideration of such a problem and an object of the present invention is to provide an easy-to-maintain, electrically driven servo-type mold oscillator, with which it is possible to increase service life.

Means for Solving the Problem

A mold oscillator according to the present invention is a mold oscillator for oscillating a mold of a continuous casting machine, characterized by including:
a servo motor;
a ball screw unit that has a ball screw having a threaded shaft and a ball nut, and a nut-side shaft fixed to the ball nut coaxially with the threaded shaft, wherein the ball screw unit is positioned so that a central axis of the ball screw unit extends in a vertical direction;
a power transmitting mechanism that transmits rotation of a rotary shaft of the servo motor to a first shaft that is one of the threaded shaft and the nut-side shaft of the ball screw unit that is positioned on a lower side;
a casing that surrounds at least part of the ball screw, the casing being configured so as to be able to submerge the ball nut of the ball screw and part of the threaded shaft of the ball screw, on which part the ball nut is engaged with the threaded shaft, in a lubricating oil to lubricate the ball screw with an oil bath;
a lubricating oil tank that stores the lubricating oil;
a collection pipe for introducing the lubricating oil to the lubricating oil tank, the collection pipe being connected to an outlet port provided in a lower portion of the casing; and
a supply device for resupplying the lubricating oil in the lubricating oil tank into the casing through an inlet port provided above the outlet port in the casing, wherein
a second shaft that is the other of the threaded shaft and the nut-side shaft of the ball screw unit is connected to the mold side.

This mold oscillator may further include: a bearing supporting the first shaft so that the first shaft can rotate about a central axis thereof; and a bearing retainer, in which a channel for communicating the outlet port with a space between an inner race and an outer race of the bearing is formed, the bearing retainer being fixed under the bearing at a position corresponding to a midpoint portion of the first shaft in a longitudinal direction thereof, wherein a seal contacting the first shaft is included in the bearing retainer so as to prevent the lubricating oil from leaking downward.

In the mold oscillator according to the present invention, a configuration may be adopted, in which
the mold oscillator further includes:
a rotary parasol portion provided on a side surface, of the first shaft of the ball screw unit below the bearing retainer and having a parasol shape widening downward, the rotary parasol portion being configured to rotate with the first shaft; and
a stationary parasol portion fixed under the rotary parasol portion and having a parasol shape widening downward, the stationary parasol portion being disposed so as to at least partially overlap the rotary parasol portion in a radial direction around an entire circumference, wherein
a drain outlet for discharging, into the outside, the lubricating oil received on the stationary parasol portion is provided in the casing.

In the mold oscillator according to the present invention, a configuration may be adopted, in which
a sealing member for sealing a gap between the casing and the second shaft is detachably fitted.

The mold oscillator according to the present invention may further include an arm mechanism, having an arm extending in a lateral direction, for oscillating the mold by moving the mold in the vertical direction through swinging movement of the arm, wherein a fulcrum is provided at a midpoint portion of the arm, one end of the arm is connected to the second shaft, and the other end of the arm is connected to the mold.

Effects of the Invention

According to the present invention, the ball nut of the ball screw and part of the threaded shaft of the ball screw, on which part the ball nut is engaged with the threaded shaft, are submerged in a lubricating oil to lubricate the ball screw with an oil bath, and therefore, it is possible to sufficiently lubricate moving parts in the casing. Accordingly, it is possible to significantly elongate life of the moving parts included in the actuator of the mold oscillator.

EMBODIMENTS FOR CARRYING OUT THE INVENTION

Figure 1:
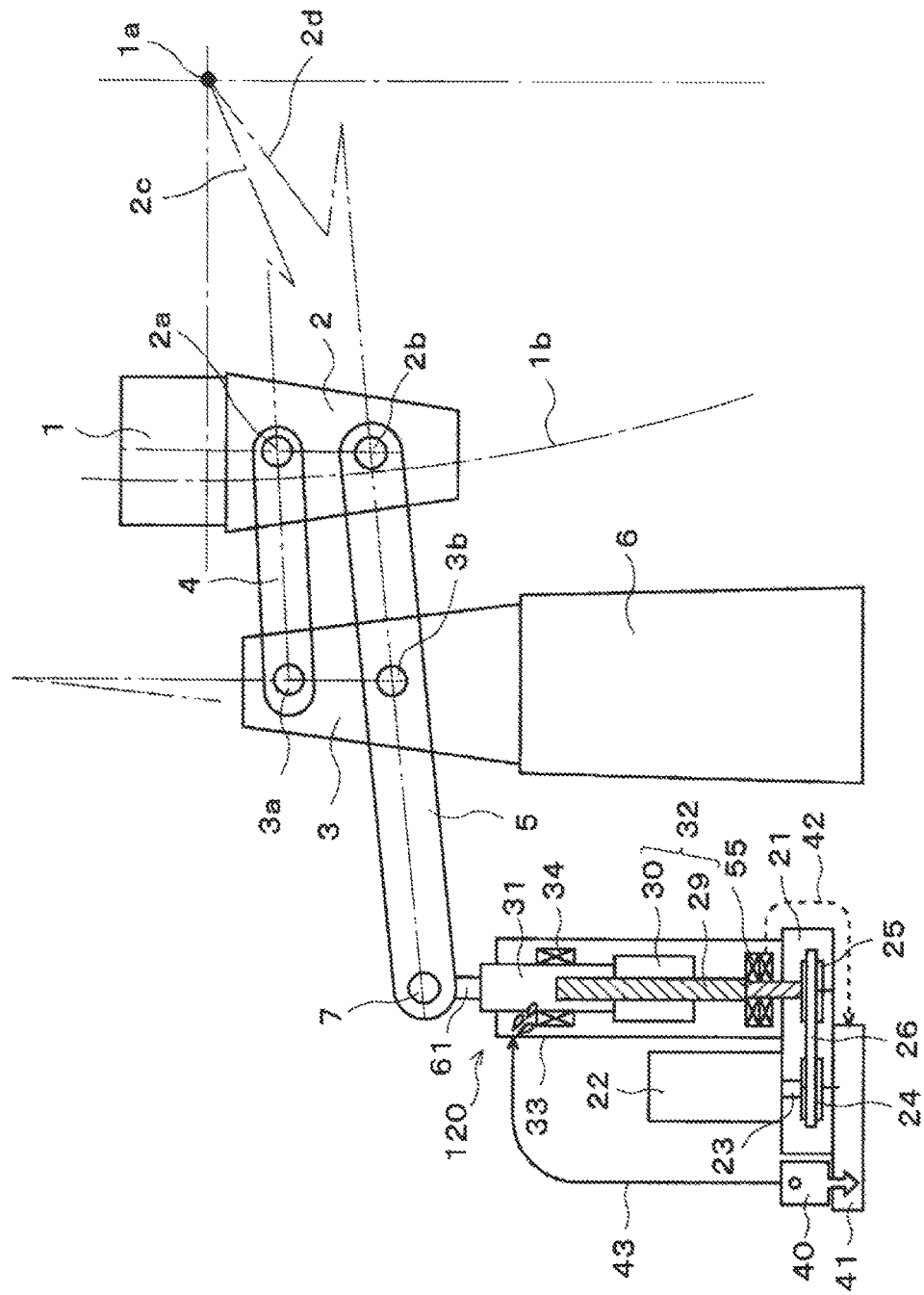
FIG. 1 is a schematic diagram showing an electrically driven actuator 120 of a mold oscillator according to an embodiment of the present invention.
Figure 11:
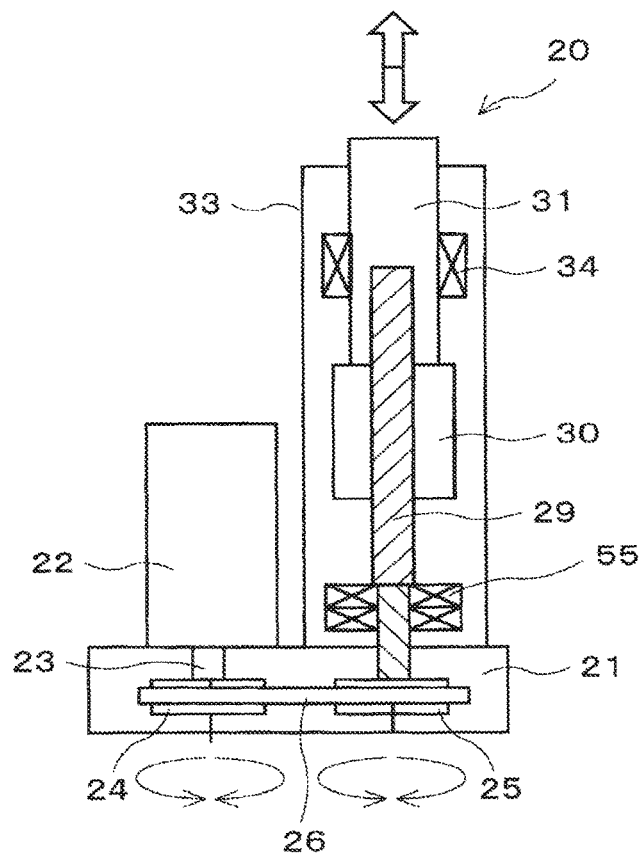
FIG. 11 is a diagram showing an electrically driven actuator of the conventional electrically driven servo-type mold oscillator.

An embodiment of the present invention will be specifically described below with reference to the accompanying drawings. FIG. 1 is a schematic diagram showing a concept of an electrically driven actuator 120 of a mold oscillator according to the embodiment of the present invention. The electrically driven actuator 120 of the mold oscillator shown in FIG. 1 is obtained by further installing a lubricating oil tank 41 under a base 21 and a pump 40 for circulating a lubricating oil stored in the lubricating oil tank 41 through a cylinder tube 33, which functions as the casing of the present invention, in addition to the electrically driven actuator 20 shown in FIG. 11. The lubricating oil sent under pressure from the pump 40 is passed through a filter (not shown), supplied to an upper portion of the cylinder tube 33 via a supply pipe 43, and collected from a lower portion of the cylinder tube 33 into the tank 41 through a collection pipe 42, whereby the lubricating oil is circulated for lubrication of a threaded shaft 29 and a ball nut 30. In this embodiment, the threaded shaft 29 and the ball nut 30 are submerged in the lubricating oil bath, so that the threaded shaft 29 and the ball nut 30, which are oscillated within a small oscillatory rotation angle and operated for a long time, are lubricated without breakdown of oil film. Moreover, the lubricating oil is collected in the tank 41, so that it is possible to easily determine the degree of degradation of the lubricating oil, which makes it possible to determine the timing of performing an overhaul of the actuator 120 of the mold oscillator. Note that, in this embodiment, the supply device includes the supply pipe 43, the pump 40, and the filter (not shown).

Figure 2:
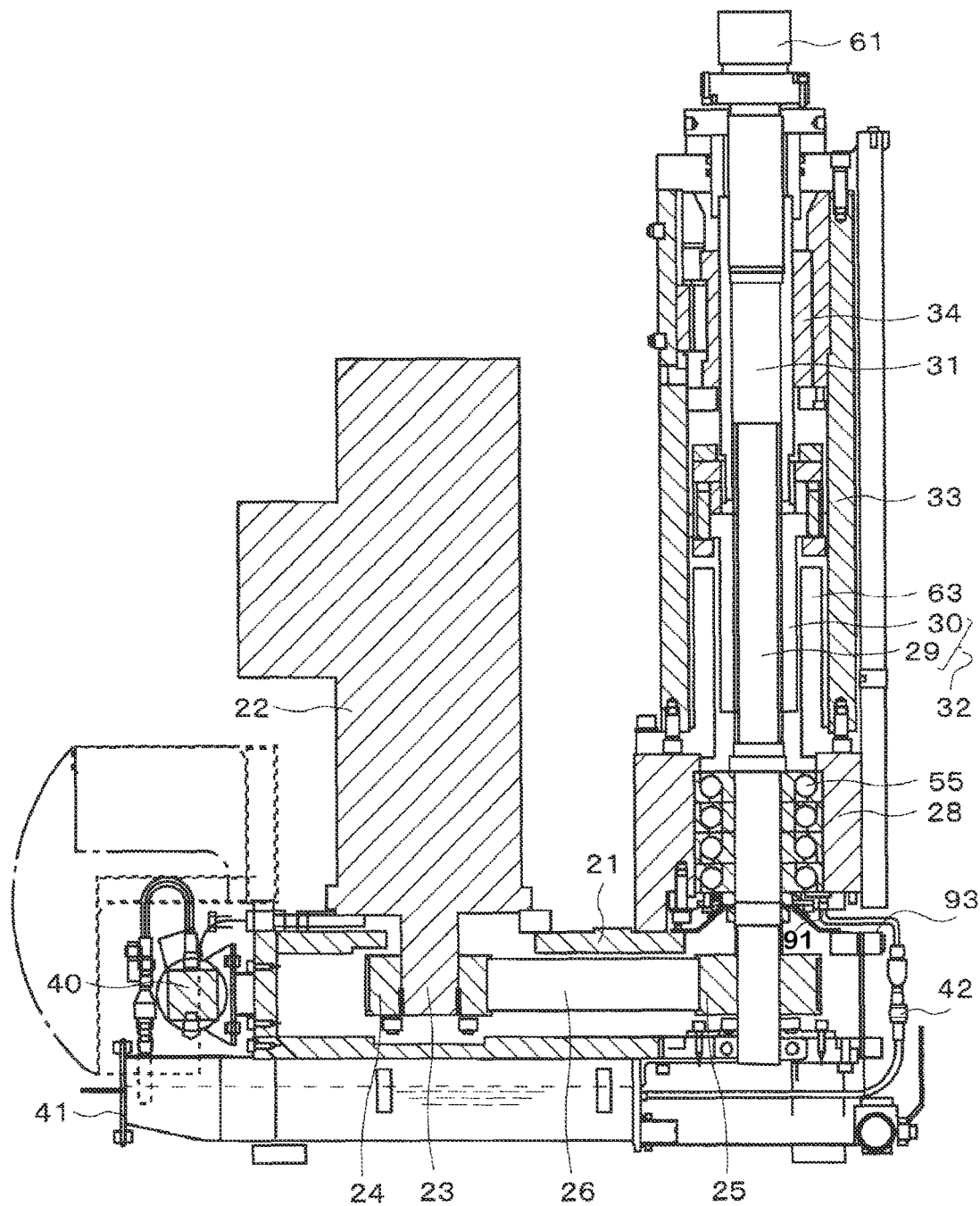
FIG. 2 is a front sectional view showing the electrically driven actuator 120 of the embodiment.
Figure 3:
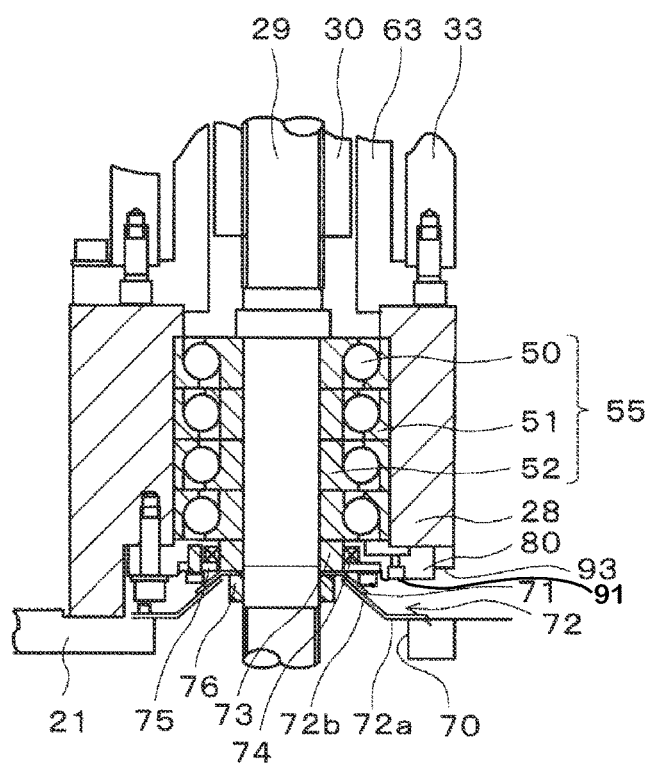
FIG. 3 is a partially enlarged view of the same.
Figure 4:
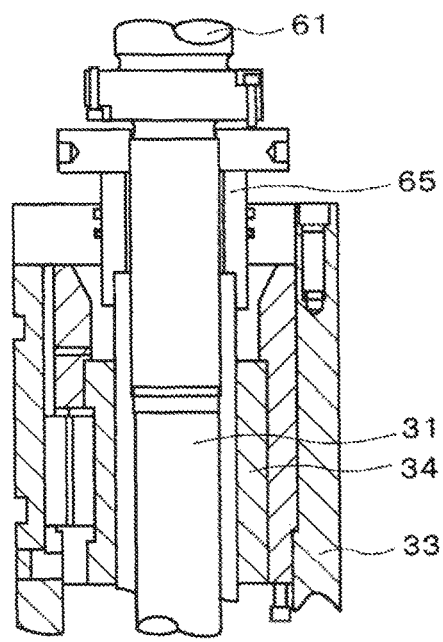
FIG. 4 is a partially enlarged view of the same.
Figure 5:
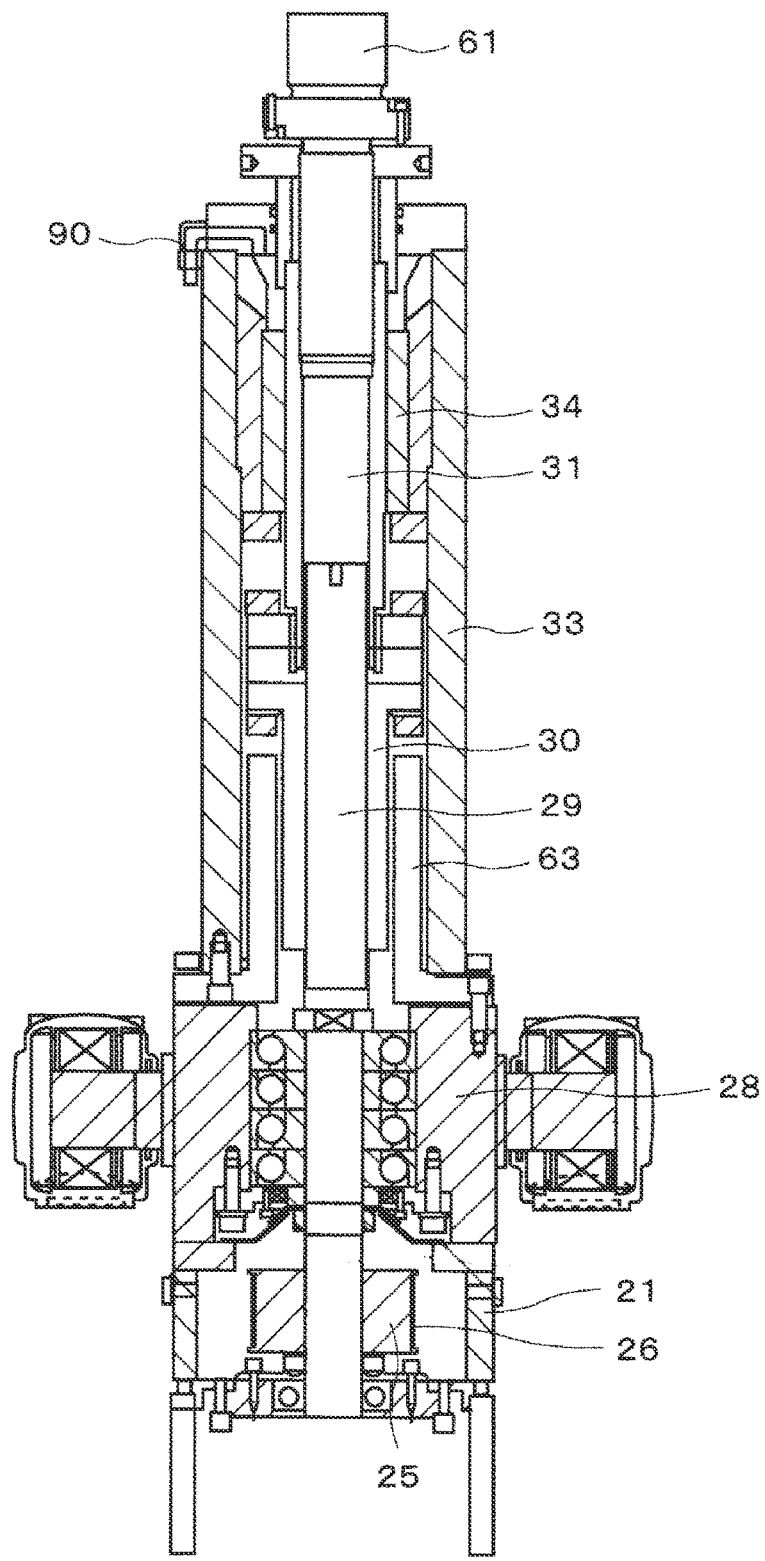
FIG. 5 is a side sectional view of the same.

Next, a structure of the electrically driven actuator 120 of this embodiment will be described in detail. FIG. 2 is a front sectional view showing the electrically driven actuator 120, and FIGS. 3 and 4 are partially enlarged views thereof. FIG. 5 is a side sectional view of the same. The base 21 is mounted on an installation floor. The circular cylinder tube 33, the central axis of which is directed in the vertical direction, is fixed in a standing position on the base 21, a bearing support portion 28 is provided under the cylinder tube 33, and angular bearings 55 are fitted into the bearing support portion 28. The threaded shaft 29 is rotatably supported by the angular bearings 55 with the central axis of the threaded shaft 29 being directed in the vertical direction. In each of the bearings 55, an outer race 51 and an inner race 52 are fixed, the outer race 51 supporting balls 50 on the outer side, the inner race 52 supporting the balls 50 on the inner side and being in contact with an outer circumferential surface of the threaded shaft 29. The balls 50 are held between the inner race 52 and the outer race 51 so as not to fall out. In this way, the balls 50 rotate in a state where the balls 50 are held between the inner race 52 and the outer race 51, so that the threaded shaft 29 is supported so as to be rotatable about the central axis thereof. In the present invention, it suffices to position the ball screw so that the central axis thereof extends, or stretches, in the vertical direction, that is, the ball screw may be disposed in an inclined position. However, when the ball screw is positioned so that the central axis thereof is directed in the vertical direction as in the case of this embodiment, it is possible to secure high stability and durability.

The ball nut 30 is disposed in this cylinder tube 33 and is screw-fitted on the threaded shaft 29 with the balls interposed therebetween. In the cylinder tube 33, a nut-side shaft 31 fixed to the ball nut 30 coaxially with the threaded shaft 29 is also disposed. Specifically, a lower end portion of the nut-side shaft 31 is fixed to an upper end portion of the ball nut 30. Accordingly, in this embodiment, the threaded shaft 29 functions as the first shaft of the present invention and the nut-side shaft 31 functions as the second shaft. Ball splines 34 are fixed to an inner surface of the cylinder tube 33 at a position corresponding to the nut-side shaft 31. The nut-side shaft 31 is supported by the ball splines 34 so as to be able to reciprocate in the vertical direction and so as not to be rotatable. Since the nut-side shaft 31 is supported by the ball splines 34 so as not to be rotatable, the nut-side shaft 31 cannot rotate about the central axis thereof. Accordingly, forward and reverse rotation (oscillatory rotation) of the threaded shaft 29 about the central axis thereof causes the ball nut 30, which is screw-fitted on the threaded shaft 29 with the balls interposed therebetween, to reciprocate in the vertical direction within a range corresponding to the oscillatory rotation angle. The nut-side shaft 31 is supported by the ball splines 34 so as to be able to move in the vertical direction and so as not to be rotatable and therefore, the nut-side shaft 31 fixed to the ball nut 30 moves in the vertical direction within the range equal to that of the ball nut 30. A cylindrical stopper 63 is disposed so as to surround she threaded shaft 29. A sealing member 65 for sealing a gap is detachably fitted between the cylinder tube 33 and the nut-side shaft 31. The nut-side shaft 31 continuously oscillates in the vertical direction and therefore, the sealing member of this portion wears severely. When the sealing member 65 is detachably fitted in this way, it it possible to avoid a situation where the entire cylinder tube 33 must be replaced because of wear of the portion contacting the nut-side shaft 31 (second shaft).

An upper end of the nut-side shaft 31 protrudes upward from the upper portion of the cylinder tube 33. Of the mold oscillator side and the mold side, the upper end of the nut-side shaft 31 is connected to the mold side. In this embodiment, the upper end of the nut-side shaft 31 is provided with a connection portion 61, which is rotatably connected to a pivot shaft 7 of a main arm 5. When the nut-side shaft 31 moves in the vertical direction, the main arm 5 swings and oscillates the mold. When a configuration is adopted, in which the mold oscillator is directly connected to a trunnion of the mold, for example, the upper end of the nut-side shaft is directly connected to the trunnion of the mold. In contrast, when a configuration is adopted, in which the mold oscillator is connected to the mold side via the main arm 5 as described above, it is possible to install the mold and the mold oscillator at separate sections with a partition wall 6 interposed therebetween, so that it is possible to avoid installing the mold oscillator in a high-temperature environment around the mold.

A motor 22 is installed on the base 21 in parallel with the cylinder tube 33. A rotary shaft 23 of the motor 22 is inserted into the base 21 with the rotation axis of the rotary shaft 23 being directed in the vertical direction. The rotary shaft 23 is provided with a pulley 24. The part of the threaded shaft 29 that is inserted in the base 21 is provided with a pulley 25. A belt 26 is looped between the pulleys 24 and 25, so that oscillatory rotation of the rotary shaft 23 of the motor 22 is transmitted to the threaded shaft 29 via the belt 26.

The, lubricating oil tank 41 is provided below the base 21 and the lubricating oil in the lubricating oil tank 41 is supplied to an inlet port 90 (see FIG. 5) provided in the upper portion of the cylinder tube 33 via the supply pipe 43 (see FIG. 1) by the small pump 40 provided above the lubricating oil tank 41. The lubricating oil supplied into the cylinder tube 33 is collected into the lubricating oil tank 41 from an outlet port 91 provided in the bearing retainer 80 in the lower portion of the casing through the collection pipe 42 (see FIGS. 1 and 2). The position, at which the inlet port is provided, is not particularly limited as long as the inlet port is provided above the outlet port. However, it is preferable that the inlet port be provided above an element for supporting the second shall (the nut-side shaft 31 in this embodiment) so as to be movable in the vertical direction and so as not to he rotatable, such as ball splines, as in the case of this embodiment. By so doing, the lubricating oil for lubricating the supporting element is also supplied by the supply device through the filter, so that it is possible to perform lubrication with the use of the lubricating oil, from which contaminants have been removed.

Figure 6:
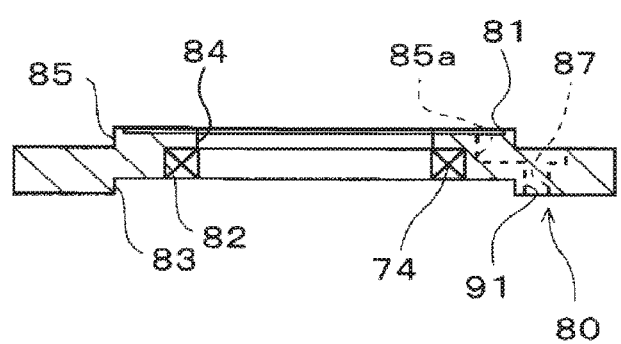
FIG. 6 is a front sectional view of a bearing retainer 80.
Figure 7:
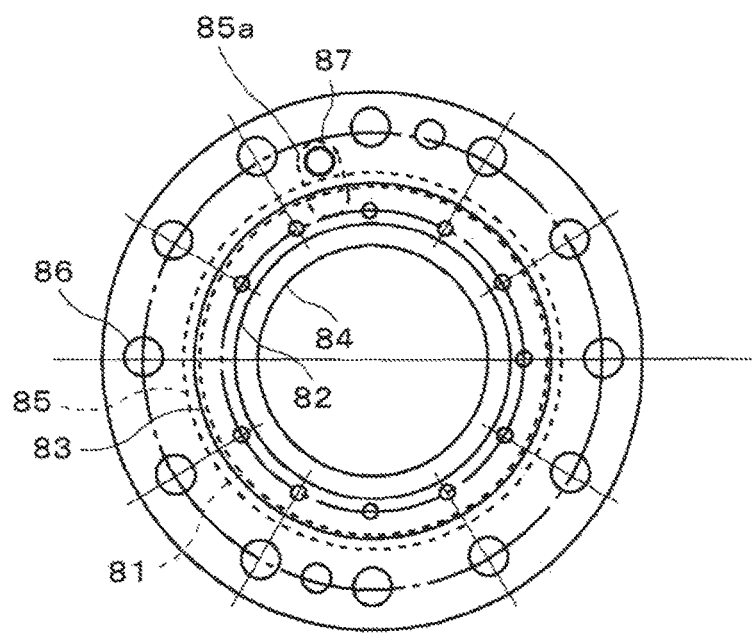
FIG. 7 is a bottom view of the bearing retainer 80.
Figure 8:
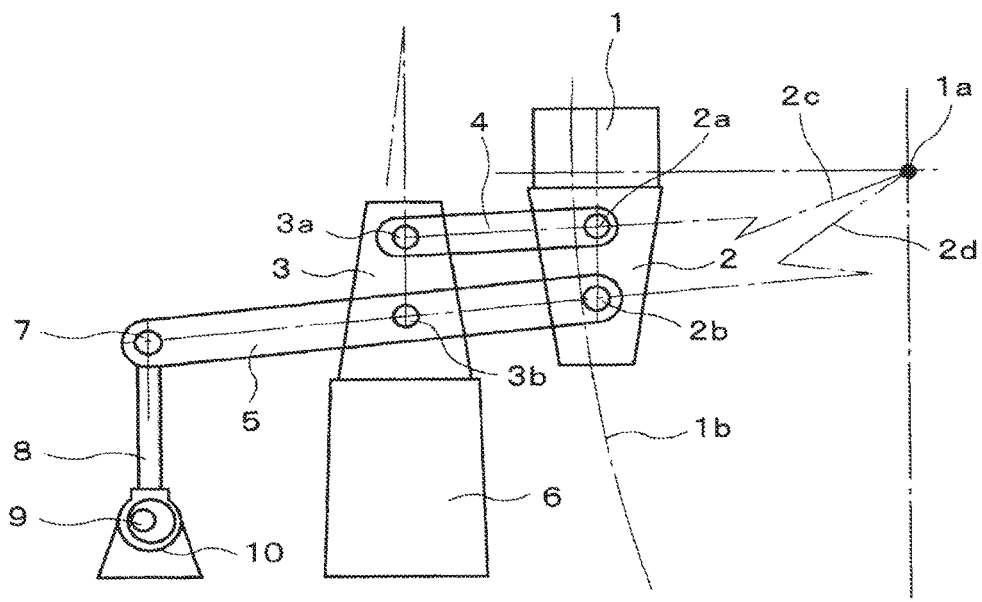
FIG. 8 is a diagram showing a conventional eccentric cam-type mold oscillator.
Figure 9:
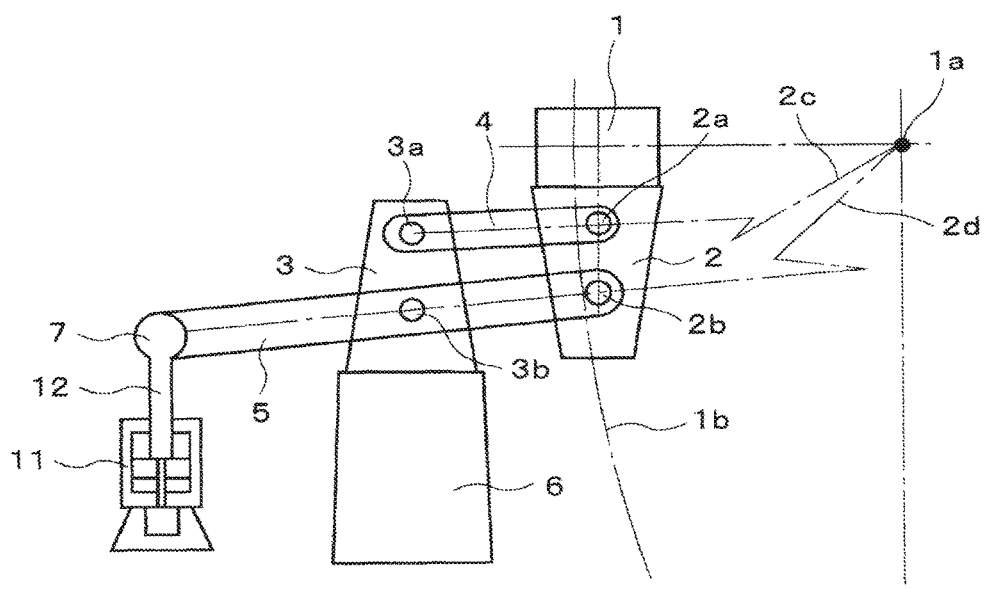
FIG. 9 is a diagram showing a conventional hydraulic servo-type mold oscillator.
Figure 10:
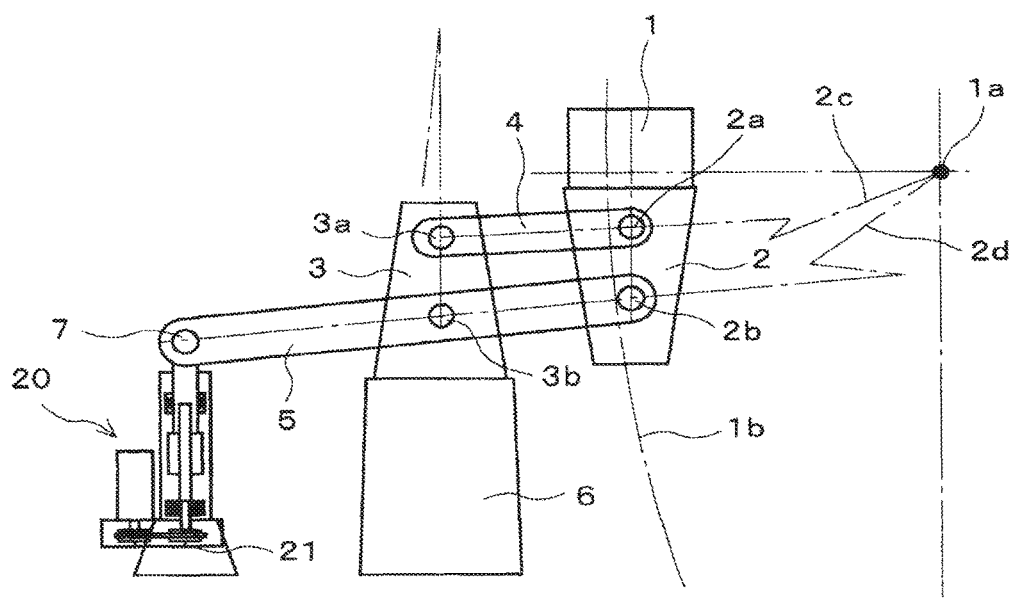
FIG. 10 is a diagram showing a conventional electrically driven servo-type mold oscillator.

A bearing retainer 80 is fixed at the bottom surface of the angular bearings 55. FIG. 6 is a front sectional view of the bearing retainer 80. FIG. 7 is a bottom view of the bearing retainer 80. The bearing retainer 80 has a circular ring shape and has a three stepped structure, including an inner hole 84 at the upper surface that has the smallest radius, a middle hole 82 that is formed below the inner hole 84, and a lower hole 83 that is formed below the middle hole 82. At the upper surface of the bearing retainer 80, an upper end 85 that has a radius smaller than that of the outermost edge or the bearing retainer 80 is formed as a step. Part of the upper surface of the bearing retainer 80 is slightly lowered to form a hollow 81 in the radially inner side of the upper end 85. The upper end 85 has a diameter the same as that of the outer edge of the bearings 55. The retainer 80 is fixed to the bottom surface of the bearing support portion 28 by screws with the upper end 85 being in contact with the bearing 55. A seal 74 is fitted into the middle hole 82 of the retainer 80. A metal ring 73 is disposed so as to be fitted onto the threaded shaft 29 between the seal 74 and the threaded shaft 29. Under the metal ring 73, a cylindrical fixing member 76 is fixed so as to be fitted onto the threaded shaft 29, and a parasol shaped member, which has a cone shape widening downward and has a horizontal ring shaped portion at the upper end, is sandwiched between the metal ring 73 and the fixing member 76, forming a rotary parasol portion 71. The seal 74 is fixed to the retainer 80 so as not to be separated from the retainer 80 by fixing a circular ring shaped retaining plate 75 to the bottom surface of the retainer 80 by screws.

An oval counterbored hole portion 85*a* is formed on the upper surface side of the retainer 80 in a portion extending from the hollow 81 to the radially outer side of the upper end 85, and a channel 87 passing through the retainer 80 in a plate thickness direction is formed in a bottom portion of the counterbored hole portion 85*a* in a radially outer side. The lubricating oil flows out of the outlet port 91 through the channel 87 in the retainer 80 and is introduced into the lubricating oil tank 41 via the collection pipe 42. In this embodiment, the cylinder tube 33, the bearing support portion 28, and the bearing retainer 80 function as the casing of the present invention.

The rotary parasol portion 71 is formed by fitting the parasol shaped member, which has the cone shape widening downward and has the horizontal ring shaped portion at the upper end, onto the threaded shaft 29 and sandwiching the horizontal ring shaped portion between the metal ring 73 and the fixing member 76 to fix the parasol shaped member to the threaded shaft 29. A stationary parasol portion 72 is formed by fixing a horizontal portion 72*a* of a parasol shaped member to an upper surface of the base 21, which parasol shaped member has a cone shaped portion 72*b* widening downward at an angle the same as that of the cone shaped portion of the rotary parasol portion 71 and has the horizontal portion 72*a* extending horizontally outward from the lower end of the cone shaped portion 72*b*. An opening 70, through which the threaded shaft 29 is passed, is formed in a top wall of the base 21. The horizontal, portion 72*a* of the parasol shaped member forming the stationary parasol portion 72 is fixed to a peripheral portion around the opening 70. The rotary parasol portion 71 that rotates with the threaded shaft 29 and the stationary parasol portion 72 that is fixed to the base 21 are disposed so that the rotary parasol portion 71 is positioned on the upper side of the stationary parasol portion 72 and the cone shaped portions of these parasol portions at least partially overlap each other in the radial direction around the entire circumference. A drain outlet 93 for discharging, into the outside, the lubricating oil received on the upper surface of the stationary parasol portion 72 is provided in the bearing support portion 28. By so doing, even when the lubricating oil leaks from the inner edge of the retainer 80 onto the rotary parasol portion 71 because of, for example, deterioration of the seal 74, the lubricating oil flows on the cone shaped portion of the rotary parasol portion 71 and the cone shaped portion of the stationary parasol portion 72 to be introduced onto the horizontal portion 72*a* of the stationary parasol portion 72, and is then discharged into the outside from the drain outlet 93. Accordingly, even when the lubricating oil leaks downward from the inner edge of the retainer 80, the lubricating oil is prevented from leaking to the area under the stationary parasol portion 72 to reach the pulley 25 or the belt 26. In this embodiment, the lubricating oil discharged from the drain outlet 93 into the outside is not collected into the lubricating oil tank, that is, discarded into the outside.

As described above, in this embodiment, operation is performed in a state where the threaded shaft 29 and the ball nut 30 are submerged in the lubricating oil, so that wear is significantly reduced. This makes it possible to increase life of the actuator of the mold oscillator. Moreover, providing the rotary parasol portion 71 and the stationary parasol portion 72 makes it possible to obtain more secure sealing against leakage of the lubricating oil to prevent the lubricating oil from entering the inside of the base 21, so that it is possible to prevent the lubricating oil from adhering to the pulleys 24 and 25 and the belt 26 in the base 21 to hamper operation thereof and to prevent deterioration of the belt.

While the present invention has been described with reference to the embodiments, the present invention is not limited to the above-described embodiments. The scope of the present invention is determined based on the attached claims and all the configurations obtained by omitting, changing, and/or improving the constituent elements within the scope of the present invention are also included in the present invention.

For example, while a configuration is described in the above embodiments, in which the first shaft, one of the threaded shaft and the nut-side shaft included in the ball screw unit of the present invention that is positioned on the lower side, is the threaded shaft, the nut-side shaft may be positioned on the lower side as the first shaft. That is, the ball screw unit may be disposed in an inverted position relative to the position in the case of the above embodiments.

While the outlet port of the present invention is provided below the bearings in the lower portion of the casing in the above embodiments, the outlet port may be provided above the bearings in the lower portion of the casing as long as the upper or lower end of the bearings is liquid-tightly sealed. However, when a configuration is adopted, in which the outlet port is provided below the bearings and the lubricating oil is passed through the space between the inner races and the outer races of the bearings and is then collected as in the case of the above embodiments, it is possible to prevent contaminants from remaining in the bearings.

DESCRIPTION OF REFERENCE NUMERALS

5: main arm
7: pivot shaft
21: base
22: motor
23: rotary shaft
24,25: pulley
26: belt
28: bearing support portion
29: threaded shaft
30: ball nut
31: nut-side shaft
32: ball screw
33: cylinder tube
34: ball spline
40: pump
41: lubricating oil tank
42: collection pipe
43: supply pipe
50: ball
51: outer race
52: inner race
55: angular bearing
87: channel
90: inlet port
91: outlet port
93: drain outlet
120: electrically driven actuator

The invention claimed is:

1. A mold oscillator for oscillating a mold of a continuous casting machine, comprising:
    a servo motor;
    a ball screw unit that includes a ball screw having a threaded shaft and a ball nut, and a nut-side shaft fixed to the ball nut coaxially with the threaded shaft, wherein the ball screw unit is positioned so that a central axis of the ball screw unit extends in a vertical direction;
    a power transmitter that is configured to transmit rotation of a rotary shaft of the servo motor to a first shaft that is one of the threaded shaft and the nut-side shaft of the ball screw unit that is positioned on a lower side, wherein a second shaft that is the other of the threaded shaft and the nut-side shaft of the ball screw unit is configured to be connected to the mold side;
    a casing that surrounds at least part of the ball screw, the casing being configured so as to be able to submerge the ball nut of the ball screw and part of the threaded shaft of the ball screw, on which part the ball nut is engaged with the threaded shaft, in a lubricating oil to lubricate the ball screw with an oil bath;
    a lubricating oil tank that stores the lubricating oil;
    a collection pipe for introducing the lubricating oil to the lubricating oil tank, the collection pipe being connected to an outlet port provided in a lower portion of the casing; and
    a lubricating oil supplier that includes a pump connected to an inlet port provided above the outlet port in the casing, the supplier being configured to resupply the lubricating oil in the lubricating oil tank into the casing through the inlet port.

2. The mold oscillator according to claim 1, further comprising:
    a bearing supporting the first shaft so that the first shaft can rotate about a central axis thereof; and
    a bearing retainer, in which a channel for communicating the outlet port with a space between an inner race and an outer race of the bearing is formed, the bearing retainer being fixed under the bearing at a position corresponding to a midpoint portion of the first shaft in a longitudinal direction thereof, wherein
    a seal contacting the first shaft is included in the bearing retainer so as to prevent the lubricating oil from leaking downward.

3. The mold oscillator according to claim 2, further comprising:
    a rotary parasol portion provided on a side surface of the first shaft of the ball screw unit below the bearing retainer and having a parasol shape widening downward, the rotary parasol, portion being configured to rotate with the first shaft; and
    a stationary parasol portion fixed under the rotary parasol portion and having a parasol shape widening downward, the stationary parasol portion being disposed so as to at least partially overlap the rotary parasol portion in a radial direction around an entire circumference, wherein
    a drain, outlet for discharging, into the outside, the lubricating oil received on the stationary parasol portion is provided in the casing.

4. The mold oscillator according to claim 1, further comprising a sealing member for sealing a gap between the casing and the second shaft, the sealing member being detachably fitted.

5. The mold oscillator according to claim 1, further comprising an arm mechanism, including an arm extending in a lateral direction for oscillating the mold by moving the mold in the vertical direction through swinging movement of the arm, wherein a fulcrum is provided at a midpoint, portion of the arm, one end of the arm is connected to the second shaft, and the other end of the arm is connected to the mold.

\* \* \* \* \*